United States Patent [19]
Berti

[11] 4,269,158
[45] May 26, 1981

[54] INTERCOOLER FOR INTERNAL COMBUSTION ENGINE

[75] Inventor: Jerome L. Berti, Chicago Heights, Ill.

[73] Assignee: Allis-Chalmers Corporation, Milwaukee, Wis.

[21] Appl. No.: 166,043

[22] Filed: Jul. 7, 1980

Related U.S. Application Data

[63] Continuation of Ser. No. 922,668, Jul. 6, 1978, abandoned.

[51] Int. Cl.³ .............................................. F02B 29/04
[52] U.S. Cl. ...................................... 123/563; 165/51
[58] Field of Search .......................... 60/599; 123/563; 165/137, 51, DIG. 9

[56] References Cited

U.S. PATENT DOCUMENTS

| | | | |
|---|---|---|---|
| 2,346,463 | 4/1944 | Szekely | 123/563 |
| 3,091,228 | 5/1963 | Maxwell | 123/563 |
| 3,881,455 | 5/1975 | Belsanti | 123/563 |
| 4,104,999 | 8/1978 | Ullrich | 123/563 |
| 4,191,148 | 3/1980 | Patel et al. | 123/563 |

Primary Examiner—Michael Koczo, Jr.
Attorney, Agent, or Firm—Arthur L. Nelson

[57] ABSTRACT

An intercooler mounted on the cylinder head with an intake manifold of an internal combustion engine. The intake manifold and cylinder head are adapted for fastening together for operation with or without the intercooler mounted between the manifold and the cylinder head. The use of a sandwich type intercooler arrangement permits use of standard components of the manifold or engine head with the optional use of the intercooler as a turbocharged engine or without as a naturally aspirated engine.

10 Claims, 5 Drawing Figures

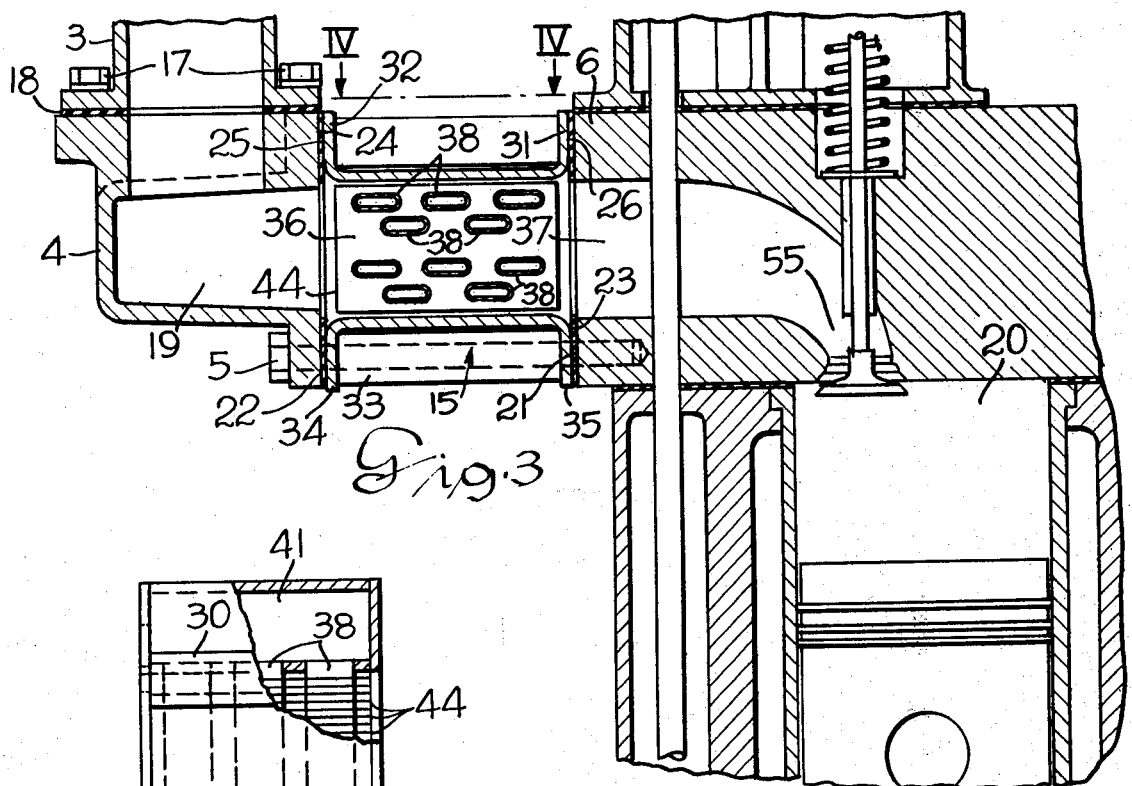
Fig. 3
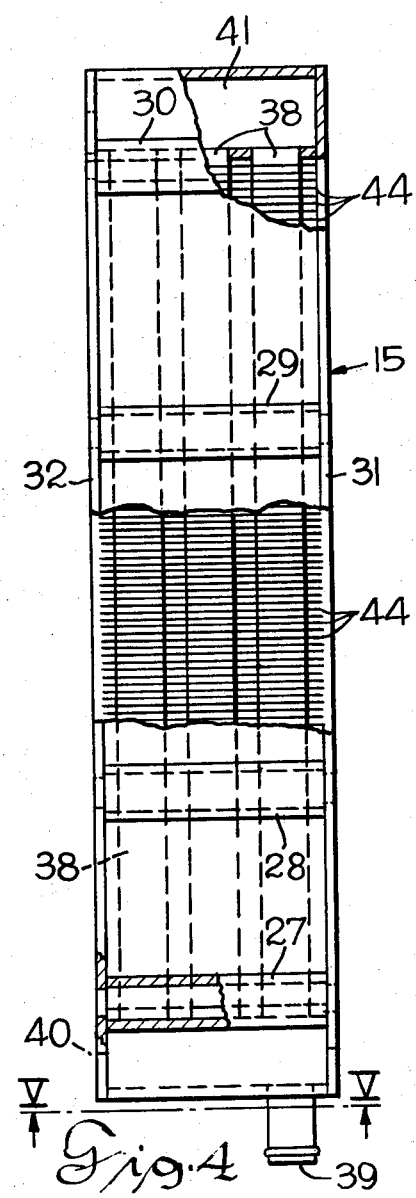
Fig. 4
Fig. 5

INTERCOOLER FOR INTERNAL COMBUSTION ENGINE

This invention relates to an intercooler for a turbocharged internal combustion engine and more particularly to an intercooler adapted for use with an intake manifold which can be mounted with or without the intercooler without modification of the manifold or the head on the internal combustion engine.

An internal combustion engine operated as a naturally aspirated engine is initially designed to develop a predetermined horsepower, with a given piston displacement. The engine when turbocharged will increase horsepower output. Turbocharging, however, increases the temperature of the air, and accordingly when the air is cooled an increased weight of air can be supplied to the engine through the intake manifold. With an increase in the weight of the air supplied to the combustion chamber, a greater amount of fuel can also be burned and the horsepower output of the engine is increased.

Accordingly, an internal combustion engine can be designed to run as a naturally aspirated engine or can be designed to run as a turbocharged engine and the degree of turbocharging depends on the horsepower to be delivered from the engine. This can all be accomplished with a fixed displacement by the pistons of the engine. Accordingly, this invention provides an intercooler which is mounted as a spacer between the cylinder head and the intake manifold. The intake manifold can be mounted directly on the cylinder head to provide a naturally aspirated engine. Without modification, the intercooler which operates as a spacer can be sandwiched between the cylinder head and the intake manifold. A suitable fastening means is provided to fasten both the intake manifold and intercooler on the cylinder head. The core of the intercooler is integral with the wall structure of the intercooler forming a passage for conveying the intake air from the intake manifold to the cylinder head. Cooling conduits extend from end to end of the intercooler with suitable cooling fins to reduce the air temperature as it passes through the intake manifold into the combustion chamber. Accordingly, the intercooler eliminates the complex manifold requiring special machining for the headers and sealing to allow for thermal expansion which varies under normal operating conditions. The conventional intercooler normally used on internal combustion engines floats in the intake manifold in the header sealing arrangement which has been eliminated by this version. The applicants' invention requires only a simple finishing operation on planar surfaces of the intercooler which is positioned between normally machined planar surfaces of the cylinder head and the intake manifold.

It is an object of this invention to provide an intercooler on an internal combustion engine.

It is another object of this invention to provide an intercooler which operates as a spacer between the intake manifold and the cylinder head. The engine can operate as a naturally aspirated engine without the intercooler or by selective positioning of the intercooler between the intake manifold and the cylinder head without modification to the engine to operate as a turbocharged engine.

It is a further object of this invention to provide an intercooler as an integral unit on an internal combustion engine removably mounted between the intake manifold and the cylinder head. The core of the intercooler is integral with the support structure and adapted for use in an engine. The intercooler is machined so that it can be sandwiched between the intake manifold and the cylinder head since the complementary surfaces between the intercooler, the intake manifold and the cylinder head are all mating surfaces permitting the interchangeable operation of the engine as a naturally aspirated engine or a turbocharged engine.

The objects of this invention are accomplished by providing an intake manifold which is machined to fit on a cylinder head through complementary surfaces forming an interface for mounting of the intake manifold on the engine to operate the engine as a naturally aspirated engine. The complementary surfaces are also machined on an intercooler to allow the sandwiching of the intercooler between the intake manifold and the cylinder head. Suitable gaskets are provided for sealing of the intake manifold, the intercooler and the cylinder head. The intercooler is an integral structure which is replaceably mounted between the intake manifold and the cylinder head with suitable fastening means. The intercooler is provided with coolant conduits extending between the ends of the intercooler and cooling fins are interleaved along the length of the coolant conduits to provide cooling of air passing through a cross passage formed in the intercooler. The cross passage in the intercooler extends between a turbocharger plenum chamber in the intake manifold and the air delivery chamber in the cylinder head for supplying air to the combustion chamber of the internal combustion engine.

Referring to the drawings, the preferred embodiment of this invention is illustrated.

FIG. 3 illustrates a cross section view of the intake manifold, the intercooler and the cylinder head of the internal combustion engine taken on line III—III of FIG. 1.

FIG. 4 is a partially sectioned view of the intercooler taken on line IV—IV as shown in FIG. 3.

FIG. 5 is a partial cross section view of the intake manifold as viewed on line V—V of FIG. 4.

Figure 1:
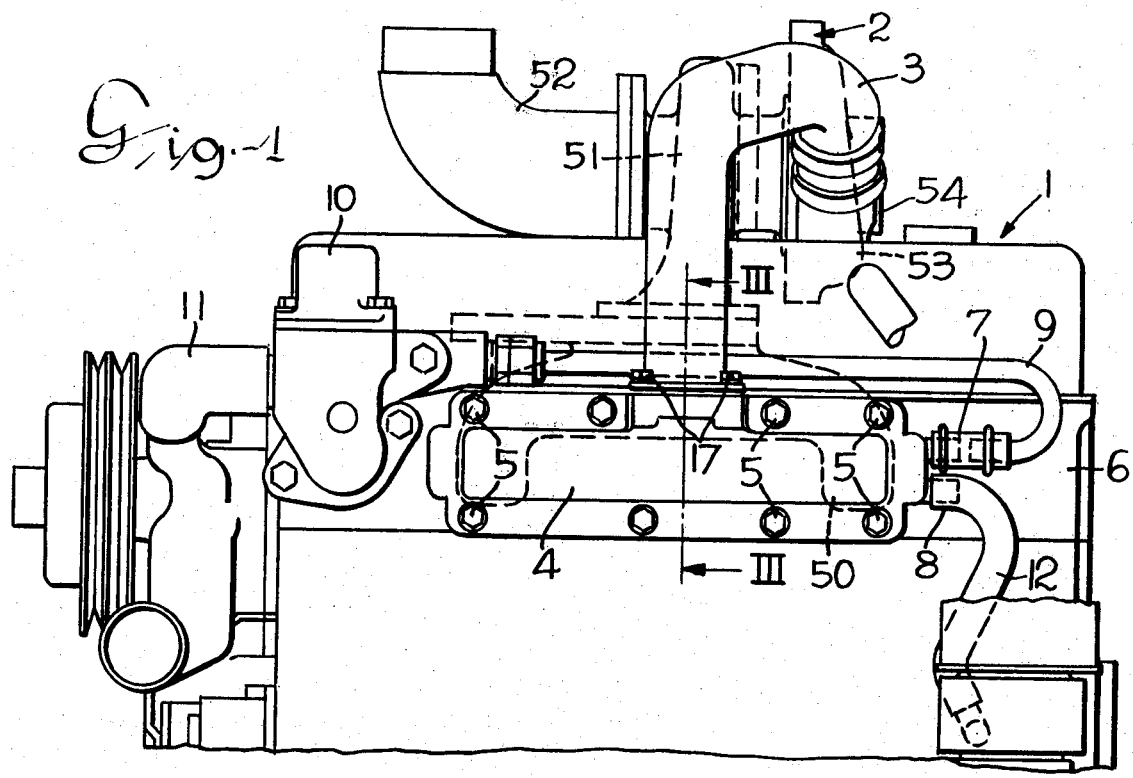
FIG. 1 illustrates a side elevation view of a turbocharged internal combustion engine.

Referring to the drawings, FIG. 1 illustrates a side elevation view of an internal combustion engine 1 and a turbocharger 2 including a compressor 53 receiving air from pipe 54 and which is delivered through the air pipe 3 to the intake manifold 4. The intake manifold 4 is mounted on the engine by a plurality of capscrews or studs 5 which extend through the intercooler to fasten to the engine head 6. The intercooler is connected through the couplings 7 and 8 to the cooling system. The hose 9 is connected to the thermostat 10 to the coolant conduits 11 connected through suitable means to a radiator for the engine. Similarly, the hose 12 is connected to the other side of the cooling system.

Figure 2:
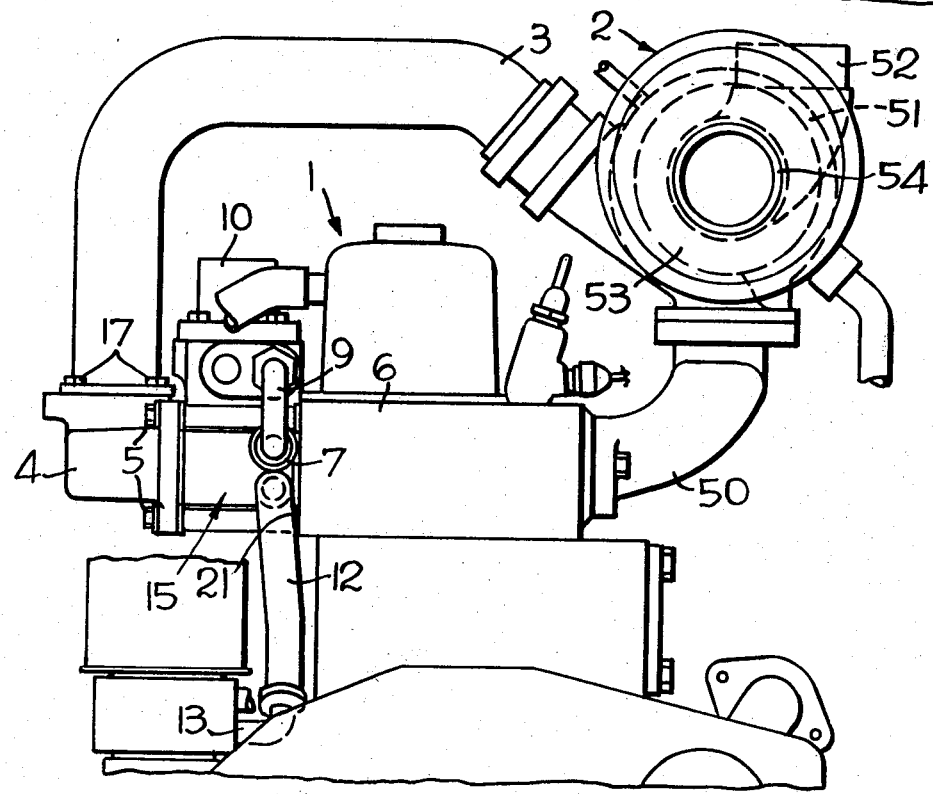
FIG. 2 illustrates an end view of the turbocharged internal combustion engine.

The intake manifold 4 is adapted for mounting directly on the facing 21 for operation without the intercooler of the head 6. The intercooler 15, however, is mounted between the intake manifold 4 and the cylinder head 6 as shown in FIGS. 2 and 3. The bolts 5 extend from the intake manifold through the intercooler to fasten to the head 6 of the engine.

FIGS. 3, 4 and 5 show the intercooler 15 in its mounting position on the engine. The intake manifold 4 is connected to the air pipe 3 by means of bolts 17 with a gasket 18 providing a seal between the pipe 3 and the intake manifold 4. The plenum chamber 19 is formed in the manifold 4 to receive air discharge from the turbocharger 2. The plenum chamber 19 contains air which has been pressurized by the turbocharger 2 which is to be supplied to the combustion chamber. The intake manifold 4 is shown fastened to the engine by means of the bolts 5 which extend from the manifold 4 through the intercooler 15 to fasten to the cylinder head 6. The gasket 22 is positioned between the intake manifold 4 and the intercooler 15. Similarly, the gasket 23 is positioned between the intercooler 15 and the facing 21 of the cylinder head 6. The facing 24 of the intake manifold is a planar facing adapted for mounting on the facing 25 of the intercooler or the facing 21 of the cylinder head 6. Similarly, the facing 21 is adapted for fastening to the face 24 of the intake manifold 4 or the facing 26 of the intercooler 15.

The intercooler 15 is formed with a plurality of sleeves 27, 28, 29 and 30 positioned between the flanges 31 and 32. Similarly, sleeves are positioned on the opposite side of the intercooler of which sleeve 33 is shown in FIG. 3 between the flanges 34 and 35. The sleeves reinforce the flanges and operate as spacers between the flanges to hold the flanges rigidly in place when the intercooler is fastened on the engine as shown in FIG. 3. The intercooler 15 operates essentially as a spacer between the intake manifold and the cylinder head 6 as shown. The plenum chamber 19 is connected by the cross passage 36 to the air delivery chamber 37 in the cylinder head 6.

Positioned in the cross passage 36 are a plurality of coolant conduits 38 which extend from the inlet chamber 40 which is connected to the inlet port 39 to the recirculating chamber 41. The coolant conduits 38 also extend to the outlet chamber 42 which is connected to the outlet port 43. The coolant flow is circulated through the intercooler 15 by flowing from the inlet port 39 to the opposite end of the intercooler and returning through alternate coolant conduits to the outlet port 43 through which it is discharged and re-enters the cooling system for the internal combustion engine.

The coolant conduits 38 extend through multiple interleaved cooling fins 44 which are mounted in the cross passage 36 to essentially fill the cross passage 36. The plenum chamber 19 receiving air discharged from the turbocharger distributes the air across the length of the cross passage 36. The supply chamber 37 in the cylinder head receives the air passing through the cross passage 36 of the intercooler 15 and distributes the air to a plurality of cylinders of the internal combustion engine. For the purpose of illustration, the engine as shown is a 4-cylinder in-line internal combustion engine.

The coolant conduits 38 are sealed at their ends in the inlet and outlet chambers 40 and 42 as well as the recirculating chamber 41. For the purpose of illustration, a double pass of coolant fluid is shown in the intercooler, although a multiple pass arrangement may be provided by repositioning of portions in the inlet and outlet chambers. The intercooler is an integral structure providing air passage through the cross passage 36 of the intercooler and circulation through the coolant conduits for cooling of the air as it passes from the intake manifold 4 to the supply chamber 37 shown in the engine supplying air to the combustion chamber 20.

The operation of the engine and intercooler will be described in the following paragraphs.

While the engine is running, exhaust gas is exhausted through the exhaust manifold 50 and the turbine 51 to the exhaust pipe 52. The turbine 51 drives a compressor 53 which pressurizes air coming from the air pipe 54 from the air cleaner and supplies air to the pipe 3 connected to the intake manifold 4. Discharged air from the compressor 53 is supplied to the plenum chamber 19 of the intake manifold 4 and the air passes through the cross passage 36 of the intercooler 15. The air continues to flow through the air supply chamber 37 in the cylinder head 6 and the intake passage 55 to the combustion chamber 20. The air compressed in the compressor by the turbocharger is heated due to the compression and accordingly, the intercooler 15 is used to cool the air before it is supplied to the engine. The hoses 9 and 12 supply and return coolant fluid from the engine cooling system. The coolant fluid flows through the inlet port 39 to the inlet chamber 40 and flows through connected coolant conduits 38 of the intercooler 15. All of the coolant fluid conduits are connected to the chamber 41, and accordingly the coolant fluid is returned to the outlet chamber 42 and flows through the outlet port 43 to return the coolant fluid to the engine cooling system. By use of the cooling system, the heat is dissipated to the atmosphere for normal operation of the engine. The intercooler in the process of cooling the air allows a greater weight of air to be supplied to the intake passage 55 and the combustion chamber 20 of the engine. By increasing the weight of the air supplied to the combustion chamber, an increased amount of fuel can also be burned under normal combustion conditions in the engine. This in turn increases the power output of the engine for a given piston displacement of the engine.

The embodiments of the invention in which an exclusive property or privilege is claimed are defined as follows:

1. An internal combustion engine having at least one cylinder comprising, a cylinder head defining a side mounting surface for an intake manifold and an air delivery chamber, an intake manifold defining a plenum chamber for receiving incoming air, an integral intercooler forming a spacer mounted on the side of said cylinder head and providing a cantilever mounting of said intake manifold including, passage walls forming a cross passage between said intake manifold and said cylinder head, peripheral reinforcing structure enclosing said passage walls on said intercooler for rigidly supporting said manifold on said engine head, said peripheral reinforcing structure defining bolt holes extending continuously through said reinforcing structure and aligned with bolt holes in said head and intake manifold for receiving common fastening means, coolant conduits extending the length of said cross passage of said intercooler for circulating coolant fluid through said conduits, a plurality of cooling fins interleaved along the cooling conduits for cooling air passing through the said cross passage, means defining cooling fluid chambers at the ends of said intercooler for circulating coolant fluid through said intercooler, complementary mounting surfaces including said side mounting surface on said cylinder head and a surface on said intake manifold adapted for selectively mounting said intake manifold directly on said cylinder head to operate the engine as a naturally aspirated engine, said intercooler defining complementary mounting surfaces for selectively mounting said intercooler between said cylinder head and said intake manifold for supporting said intake manifold connected to a supercharger when operating the engine as a supercharged engine.

2. An internal combustion engine having at least one cylinder as set forth in claim 1 wherein said peripheral reinforcing structure defines said mounting surfaces on said intercooler.

3. An internal combustion engine having at least one cylinder as set forth in claim 1 wherein said fastening means includes bolts extending through said aligned holes for simultaneously fastening said intake manifold on said intercooler and said intercooler on said cylinder head.

4. An internal combustion engine having at least one cylinder as set forth in claim 1 wherein said intercooler provides a mounting for the intake manifold and connection to a supercharger.

5. An internal combustion engine having at least one cylinder as set forth in claim 1 wherein, said intercooler includes an inlet coolant chamber and an outlet coolant chamber one end of said intercooler in communication with said coolant conduits, a coolant chamber on the opposite end of said intercooler for returning fluid on the opposite side of said intercooler for circulating coolant fluid through said intercooler.

6. An internal combustion engine having at least one cylinder as set forth in claim 1 wherein, said intercooler includes inlet and outlet ports in said intercooler for connection to a cooling system of said internal combustion engine.

7. An internal combustion engine having at least one cylinder as set forth in claim 1 including, a sealing gasket positioned between said intake manifold and said intercooler, a sealing gasket positioned between said intercooler and said cylinder head to provide a continuous sealed passage from said plenum chamber to said supply chamber in said cylinder head.

8. An internal combustion engine having at least one cylinder as set forth in claim 1 wherein, said fins fill said cross passage to extend from said plenum chamber in said intake manifold to said supply chamber in said cylinder head.

9. An internal combustion engine having at least one cylinder as set forth in claim 1 wherein, said walls defining said cross passages include reinforcing sleeves defining bolt holes externally of said cross passage, mounting flanges extending over the ends of said sleeves to form mounting surfaces on said intercooler for mounting on said cylinder head and said intake manifold.

10. An internal combustion engine having at least one cylinder as set forth in claim 1 including a supercharger, means supporting said intercooler on the side of said engine to provide a rigid cantilever mounting of said intake manifold.

* * * * *